Patented Apr. 5, 1949

2,466,157

UNITED STATES PATENT OFFICE 2,466,157

PRODUCTION OF NICOTINE-HEAVY METAL SILICATES

Frederick E. Dearborn, Washington, D. C.

No Drawing. Application November 7, 1945, Serial No. 627,270

4 Claims. (Cl. 260—291)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to compositions of matter having combined insecticidal and fungicidal properties and to processes for making the same, and it has as its prime object the provision of such new compositions which contain fixed nicotine as the principal toxic ingredient.

Another object of the invention is to provide such compositions which are more toxic to insects than nicotine alone and which can be applied to vegation either as a spray or as a dust without causing injury to plants.

A further object is to stabilize the nicotine against the destructive action of sunlight and the leaching effect of rain when the compositions are applied to vegation, thus prolonging their usefulness.

Other objects will be apparent from the description of the invention.

It is well known that nicotine, while being a highly efficient insecticide, both as a contact and as a stomach poison, does not possess any fungicidal properties. Furthermore, nicotine is not stable against the destructive action of sunlight, which, through its ultra-violet and visible short wave-length rays, readily oxidizes or otherwise reduces the toxicity of nicotine in a short time, thus rendering it ineffective and necessitating frequent application in order to insure control of insects. In this invention, however, the nicotine is stabilized against the destructive effects of sunlight by being chemically combined with a suitable metallic salt, the metallic salt blocking the sun's rays and thus preventing them from decomposing the nicotine. This invention, furthermore, in addition to providing products which have the desirable properties described above, provides a process whereby the same products of the invention are rendered water-repellent, thus negating the leaching effect of rain or other sources of water.

Nicotine, and many of its salts such as nicotine sulfate, combines with certain heavy metallic salts such as copper, zinc, mercury, and others, to form complex salts (See Compt. Rend. Acad. Sci. (Paris) 14: 224, 226; 1842), and their toxicity both as a contact and as a stomach poison, are appreciably increased when in chemical combination with such heavy metallic salts. This has been shown by tests made against the cockroach and the codling moth larvae.

Copper, in numerous insoluble or slightly soluble compounds, has long been recognized as a highly efficient fungicide and has been extensively used as such. Recently, zinc compounds have been used effectively against certain fungi. Mercury compounds are well known bactericides and fungicides, and have also been extensively used.

In the present invention, insoluble heavy metal salts such as copper, zinc, and mercury silicates, are chemically combined with nicotine in a novel manner to yield new complex nicotine-heavy metal silicates. These nicotine-heavy metal silicates have combined insecticidal and fungicidal properties in which the toxicity of the nicotine both as a contact and as a stomach poison is appreciably increased, the nicotine is stabilized against the destructive rays of the sun, and the product itself may be suspended in water or ground to a fine dust and applied either as a spray or as a dust to vegetation without causing any injury to the plants. Furthermore, as mentioned above, the product, in addition to having the above properties, may be rendered water repellent by a process to be later described. The products of the invention are superior to the ordinary mechanical mixture of a nicotine preparation and a copper fungicide, for example. Such a mixture has a greatly reduced toxicity when applied to vegetation either as a spray or as a dust, and causes considerable foliage injury. That this is the case was shown when such a mechanical mixture was applied to apple-tree foliage in tests conducted against the codling moth.

The compositions of the invention, which are insoluble nicotine-heavy metal silicates, such as nicotine-copper silicate, nicotine-zinc silicate, and nicotine-mercury silicate, can be prepared by either of two methods hereinafter designated as Method A and Method B.

Method A involves chemically reacting a water suspension of an insoluble heavy metal silicate (prepared by chemically reacting a soluble, substantially pure sodium silicate such as water glass with a soluble heavy metal salt such as copper sulfate, zinc sulfate, or mercuric chloride) with a solution of free nicotine (present as the free alkaloid), or nicotine sulfate. Method B involves chemically reacting a nicotine-soluble heavy metal salt with a solution of substantially pure sodium silicate. In both of these methods, the reactions are conducted at a temperature of about from 50° to 100° C. These methods will be described later in greater detail.

The products resulting from either of these methods of preparation are filtered, dried, and then ground to a very fine dust, the smaller the particle size, the greater the toxicity to insects and the greater the foliage coverage.

The products are insoluble solids containing about 10 percent or more of chemically combined nicotine, are stable to sunlight, and readily ground to a fine dust. They possess high, combined insecticidal and fungicidal properties. They are readily suspended in water without the use of a wetting agent and are easily applied to vegetation, either as a spray or as a dust, without causing plant injury.

If it is desired to obtain a water-repellent product which will not be wet by water without the addition of a wetting agent, about 1 to 5 percent by weight of a soluble alkali salt of a solid monocarboxylic acid containing 10 or more carbon atoms (one that is normally solid at ordinary room temperature) such as sodium stearate, sodium palmitate, and so forth, in solution, is added and mixed well with the water suspension of Method A or to the sodium silicate solution in Method B, before reacting with the nicotine or nicotine sulfate. This alkali salt of the monocarboxylic acid apparently enters into the reaction, since a uniform product results which is water repellent.

The water-repellent products possess the same characteristics as the water-wettable products, with the exception that they are not wet by water without the use of a wetting agent, and when properly applied to foliage, are less readily removed by water than is the water-wettable product. The water-repellent products are more suitable for dusting than for spraying, since they do not produce as good a suspension in water as does the water-wettable product.

In preparing the new compositions of matter according to Method A, a water suspension of a heavy metal silicate such as copper silicate, zinc silicate, mercuric silicate, and a solution of free nicotine (present as the free alkaloid) or nicotine sulfate are chemically reacted at a temperature of about from 50° to 100° C. The heavy metal silicate used can be a washed and dried material which has been finely ground, or a freshly precipitated material which has been freed from soluble salts by washing. If the reactants are used in the exact chemical proportions for combination, the reaction will proceed to neutrality. However, to use these exact proportions is inconvenient, and it is preferred to use an excess of the nicotine or nicotine sulfate. If excess nicotine sulfate is used in the process, some of the metal of the metal silicate will be dissolved because of the development of acidity, presumably due to the splitting-off of free sulfuric acid from the nicotine sulfate during the reaction. It is therefore important to maintain substantial neutrality of the reaction mixture, and this is accomplished by the addition of a dilute solution of sodium silicate (water glass). If excess free nicotine is used, the reaction mixture becomes alkaline and should be neutralized by the addition of a solution of a soluble salt of the heavy metal being used as one of the reactants. If not neutralized, an alkaline condition would result, with an excessive loss of nicotine and, in some cases, the formation of the metallic oxide, especially when a copper salt is used.

The resulting products are insoluble solids, stable to sunlight and readily wet by water. When dry, they are capable of being ground to a very fine dust which has highly combined insecticidal and fungicidal properties.

The following examples, in which are indicated some of the materials and quantities necessary in carrying out Method A, are illustrative of the invention:

Example I

To prepare 100 grams of a combined insecticide and fungicide containing approximately 17 percent of copper and 10 percent of nicotine, the following approximate weights of materials are required:

Grams
Copper silicate (containing 19 percent of copper) _____ 89
Nicotine (95 percent of free alkaloid) _____ 12
or
Nicotine sulfate (containing 40 per cent of nicotine) _____ 30

The resultant products, nicotine-copper silicates, are bluish-green solids, insoluble in water, stable to sunlight, and readily suspended in water. When dry, they are capable of being ground to very fine dust which is extremely toxic to insects.

When products which are water repellent are desired, about 1 to 5 percent by weight of a soluble alkali salt of a solid monocarboxylic acid (i. e., an acid which is normally solid at ordinary room temperature), as, for example, sodium stearate and sodium palmitate, in solution, is added to and mixed well with the water suspension of the metal silicate before heating and reacting with the nicotine or nicotine sulfate.

The water-repellent products possess the same characteristics as the water-wettable products, with the exception that they are not wet by water without the use of a wetting agent, and when properly applied to foliage are less readily removed by water.

Example II

To prepare 100 grams of a product containing approximately 18 percent of zinc and 10 percent of nicotine, the following approximate weights of materials are required:

Grams
Zinc silicate (containing 20 percent of zinc) __ 89
Nicotine (95 percent of free alkaloid) _____ 12
or
Nicotine sulfate (containing 40 percent of nicotine) _____ 28

The resulting products, nicotine-zinc silicates, are cream to light brown, in color, and exhibit the same characteristics of the water-wettable products of Example I.

The water-repellent products are prepared in the same manner as described under Example I and possess the same characteristics of the water-repellent products of Example I.

Example III

To prepare 100 grams of a product containing approximately 39 percent of mercury and 10 percent of nicotine, the following approximate weights of materials are required:

| | Grams |
|---|---|
| Mercury silicate (containing 43 per cent of mercury) | 90 |
| Nicotine (95 percent of free alkaloid) | 12 |
| or | |
| Nicotine sulfate (containing 40 percent of nicotine) | 26 |

The resulting products, nicotine-mercury silicates, are flesh-colored solids and exhibit the same characteristics of the water-wettable products of Example I.

The water-repellent products are prepared in the same manner as described in Example I and possess the same characteristics of the water-repellent products of Example I.

In preparing the new compositions of matter according to Method B, a solution of free nicotine (as the free alkaloid) or nicotine sulfate is first chemically reacted at a temperature of about from 50° to 100° C. with an aqueous solution of a soluble heavy metal salt such as copper sulfate, zinc sulfate, and mercuric chloride, to form a nicotine-heavy metal salt. The salt, in turn, is then chemically reacted at a temperature of about from 50° to 100° C. with a dilute solution of sodium silicate (water glass) in the proper proportions to completely react with the nicotine-heavy metal salt. The resulting slurry is heated to boiling with agitation and kept as nearly neutral as possible, as in Method A, by the addition of a dilute solution of sodium silicate if acidic, or by the addition of a solution of the soluble heavy metal salt if alkaline. Boiling for a short time generally improves the physical properties of the final product.

In this method, it is preferable to use the heavy metal sulfates when sufficiently water soluble, since the resulting alkali sulfates formed during the chemical reaction are not as injurious to vegetation as are some of the other salts such as the chlorides, if not completely removed from the product by washing. It is to be understood, however, that the invention is not limited to the use of the sulfates only, but any other soluble salt of a heavy metal may be used.

The following examples, in which are indicated some of the materials and the quantities necessary in carrying out Method B, are illustrative of the invention:

Example IV

To prepare 100 grams of a product containing approximately 17 percent of copper and 10 percent of nicotine, the following approximate weights of materials are required:

| | Grams |
|---|---|
| Copper sulfate ($CuSO_4.5H_2O$) | 67 |
| Nicotine (95 percent of free alkaloid) | 12 |
| or | |
| Nicotine sulfate (containing 40 percent of nicotine) | 30 |
| Sodium silicate (water glass) | 130 |

The resulting products, nicotine-copper silicates, have the same properties as the water-wettable products of Example I.

Water-repellent products are prepared in the same manner as that described under Example I, except that the solution of the alkali salt of the solid monocarboxylic acid is added and mixed well with the sodium silicate solution before heating and reacting with the nicotine or nicotine sulfate.

The water-repellent products possess the same characteristics as the water-wettable products except that they are not wet by water without the use of a wetting agent, and when properly applied to foliage are less readily removed by water.

Example V

To prepare 100 grams of a product containing approximately 18 percent of zinc and 10 percent of nicotine, the following approximate weights of materials are required:

| | Grams |
|---|---|
| Zinc sulfate ($ZnSO_4.7H_2O$) | 79 |
| Nicotine (95 percent of free alkaloid) | 12 |
| or | |
| Nicotine sulfate (containing 40 percent of nicotine) | 28 |
| Sodium silicate (water glass) | 130 |

The resulting products, nicotine-zinc silicates, have the same properties as the water-wettable products of Example II.

The water-repellent products are prepared in the same manner as that outlined under Example IV and exhibit the same properties of the water-repellent products of that example.

Example VI

To prepare 100 grams of a product containing approximately 39 percent of mercury and 10 percent of nicotine, the following approximate weights of materials are required:

| | Grams |
|---|---|
| Mercuric chloride ($HgCl_2$) | 47 |
| Nicotine (95 percent of free alkaloid) | 11 |
| or | |
| Nicotine sulfate (containing 40 percent of nicotine) | 26 |
| Sodium silicate (water glass) | 130 |

The resulting products, nicotine-mercury silicates, have the same properties as the water-wettable products of Example III.

Water-repellent products are prepared in the manner outlined under Example IV and exhibit the same properties as the water-repellent products of that example.

The products obtained by either of the aforementioned methods of preparation are filtered, dried, and then ground to a very fine dust, the smaller the particle size the greater the toxicity to insects and the greater the foliage coverage.

It may be noted that sodium silicate, known as water glass, is not a definite compound and may vary from a ratio of $SiO_2$ to $Na_2O$ of 1 to 4. Mineral Resources of the United States. 1918. Pt. II, p. 190. (G. F. Laughlin). However, other references assign to it the formula $Na_2Si_4O_9$, with a molecular weight of 302.23. Handbook of Chemistry and Physics. Hodgman-Lange, 15th ed., 1941–1942, p. 458. The sodium silicate used in the present invention gave a copper salt containing 22.3 percent copper, the theoretical copper content for a compound of the formula $CuSi_4O_9$ being 19.8 percent.

Having thus described my invention, I claim:

1. A process of preparing a nicotine-heavy metal silicate comprising reacting a heavy metal silicate selected from the group consisting of copper silicate, zinc silicate, and mercuric silicate, with a member of the group consisting of free nicotine and nicotine sulfate in a substantially neutral aqueous medium at a temperature of about from 50° to 100° C.

2. A process of preparing a nicotine-copper silicate comprising reacting copper silicate with a member of the group consisting of free nicotine and nicotine sulfate in a substantially neutral aqueous medium at a temperature of about from 50° to 100° C.

3. A process of preparing a nicotine-zinc silicate comprising reacting zinc silicate with a member of the group consisting of free nicotine and nicotine sulfate in a substantially neutral aqueous medium at a temperature of about from 50° to 100° C.

4. A process of preparing a nicotine-mercuric silicate comprising reacting mercuric silicate with a member of the group consisting of free nicotine and nicotine sulfate in a substantially neutral aqueous medium at a temperature of about from 50° to 100° C.

FREDERICK E. DEARBORN.

REFERENCES CITED

The following references are of record in the file of this patent:

UNITED STATES PATENTS

| Number | Name | Date |
| --- | --- | --- |
| 1,915,334 | Salzberg et al. | June 27, 1933 |
| 2,110,608 | Moore et al. | Mar. 8, 1938 |
| 2,311,629 | Arnold (I) | Feb. 23, 1943 |
| 2,343,359 | Arnold (II) | Mar. 7, 1944 |
| 2,356,185 | Smith | Aug. 22, 1944 |
| 2,360,042 | Dearborn | Oct. 10, 1944 |
| 2,429,567 | Sowa | Oct. 21, 1947 |

OTHER REFERENCES

Hansberry et al., Jour. Econom. Entomol., vol. 34 (1), pp. 80–83 (1941).

Markwood, Jour. Assor. Off. Agric. Chem., vol. XXV (2), pp. 474–478 (1942).